US009784597B2

United States Patent
Tanabe et al.

(10) Patent No.: US 9,784,597 B2
(45) Date of Patent: Oct. 10, 2017

(54) VOLTAGE SUPPLY APPARATUS

(71) Applicant: Mitsubishi Electric Corporation, Tokyo (JP)

(72) Inventors: Akira Tanabe, Tokyo (JP); Hiroyoshi Takeuchi, Tokyo (JP); Yoji Tsutsumishita, Tokyo (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 0 days.

(21) Appl. No.: 15/329,476

(22) PCT Filed: Aug. 21, 2014

(86) PCT No.: PCT/JP2014/071862
§ 371 (c)(1),
(2) Date: Jan. 26, 2017

(87) PCT Pub. No.: WO2016/027341
PCT Pub. Date: Feb. 25, 2016

(65) Prior Publication Data
US 2017/0211950 A1     Jul. 27, 2017

(51) Int. Cl.
G01D 5/249     (2006.01)
G01D 9/00     (2006.01)
H02J 9/06     (2006.01)

(52) U.S. Cl.
CPC ............ *G01D 5/2497* (2013.01); *G01D 9/005* (2013.01); *H02J 9/061* (2013.01)

(58) Field of Classification Search
CPC ........ G01D 5/2497; G01D 9/005; H02J 9/061
(Continued)

(56) References Cited

U.S. PATENT DOCUMENTS

2013/0015709 A1     1/2013    Matsunaga et al.

FOREIGN PATENT DOCUMENTS

| EP | 2 389 565 B1 | 1/2016 |
|---|---|---|
| JP | 63-116133 A | 5/1988 |

(Continued)

OTHER PUBLICATIONS

International Search Report for PCT/JP2014/071862 dated Nov. 18, 2014 [PCT/ISA/210].

(Continued)

*Primary Examiner* — Rexford Barnie
*Assistant Examiner* — Thai Tran
(74) *Attorney, Agent, or Firm* — Sughrue Mion, PLLC; Richard C. Turner (57) ABSTRACT

A voltage supply apparatus includes: a primary cell; and a constant voltage supply unit. The constant voltage supply unit has set therein a voltage drop determination value, which is a threshold that is higher than a positional-data loss level and is lower than a second output voltage, which is a constant voltage at a steady voltage level that the constant voltage supply unit outputs when in a steady state. The constant voltage supply unit converts a first output voltage of the primary cell to the second output voltage and supplies it to the absolute-position detection apparatus until the first output voltage falls below the threshold. When the first output voltage falls below the threshold, the constant voltage supply unit converts the first output voltage to a third output voltage which is a voltage at the same level as the threshold, and supplies it to the absolute-position detection apparatus.

2 Claims, 4 Drawing Sheets

(58) Field of Classification Search
USPC .......................................................... 307/64
See application file for complete search history.

(56) References Cited

FOREIGN PATENT DOCUMENTS

| JP | 06-258099 A | 9/1994 |
|---|---|---|
| JP | 07-039079 A | 2/1995 |
| JP | 08-286983 A | 11/1996 |
| JP | 11-069637 A | 3/1999 |
| JP | 2000-267186 A | 9/2000 |
| JP | 2001-069677 A | 3/2001 |
| JP | 2001-309577 A | 11/2001 |
| JP | 2002-213994 A | 7/2002 |
| JP | 2003-014830 A | 1/2003 |
| JP | 2005-312089 A | 11/2005 |
| JP | 2006-067776 A | 3/2006 |
| JP | 2007-278893 A | 10/2007 |
| JP | 2007-288970 A | 11/2007 |
| JP | 2007-292608 A | 11/2007 |
| JP | 2008-216115 A | 9/2008 |
| JP | 2009-232675 A | 10/2009 |
| JP | 2010-002267 A | 1/2010 |
| JP | 2010-145266 A | 7/2010 |
| JP | 2011-211791 A | 10/2011 |
| JP | 2013-007696 A | 1/2013 |
| JP | 2013-137255 A | 7/2013 |
| JP | 2014-027707 A | 2/2014 |
| WO | 2010/069692 A1 | 6/2010 |

OTHER PUBLICATIONS

Written Opinion for PCT/JP2014/071862 dated Nov. 18, 2014 [PCT/ISA/237].
Notification of Reason for Refusal issued in the corresponding JP Application No. 2015-534710 dated Aug. 18, 2015.
Notification of Reason for Refusal issued in the corresponding JP Application No. 2015-534710 dated Nov. 9, 2015.
Decision to Grant a Patent issued in the corresponding JP Application No. 2015-534710 dated Mar. 9, 2016.
Notification of Reason for Refusal issued in the corresponding TW Application No. 104123850 dated Apr. 14, 2016.

VOLTAGE SUPPLY APPARATUS

CROSS REFERENCE TO RELATED APPLICATIONS

This application is a National Stage of International Application No. PCT/JP2014/071862 filed Aug. 21, 2014, the contents of all of which are incorporated herein by reference in their entirety.

FIELD

The present invention relates to a voltage supply apparatus that supplies a backup power supply voltage to an absolute-position detection apparatus.

BACKGROUND

Motor control systems that drive industrial machines include a motor that supplies power to an object to be driven; a controller that generates a position command for the motor and transmits the position command to a motor control apparatus; an absolute-position detection apparatus that detects positional data on the motor and transmits the positional data to the motor control apparatus; and the motor control apparatus that drives the motor on the basis of the position command for the motor and the positional data on the motor.

A constant voltage needs to be supplied to the absolute-position detection apparatus for the absolute-position detection apparatus to detect and store the positional data. While power is supplied to the motor control apparatus, a constant voltage can be supplied to the absolute-position detection apparatus from a constant-voltage power supply circuit in the motor control apparatus. However, when power is not being supplied to the motor control apparatus, it is necessary to provide an auxiliary power supply to supply a constant voltage to the absolute-position detection apparatus.

A voltage supply apparatus that is a conventional auxiliary power supply uses a primary cell that is compact and does not need an external power supply. However, the output voltage of the primary cell drops when it is used over the long-term because of the product life and aging. The measure conventionally taken against this problem is that, when the output voltage of the primary cell drops, the absolute-position detection apparatus transmits a warning signal to warn that the output voltage of the primary cell has dropped or the motor control apparatus monitors the output voltage of the primary cell, thereby prompting the user to replace the primary cell. However, when the output voltage of the primary cell drops sharply, there is not sufficient time before the primary cell becomes unusable after the warning signal is generated, i.e., the cell replacement grace period for replacing the primary cell is not sufficient. This poses a problem in that the absolute-position detection apparatus cannot retain positional data and thus the positional data is lost.

To solve such a problem, the voltage supply apparatus in Patent Literature 1 described below includes a main backup cell that is a secondary cell and an auxiliary backup cell that is a primary cell. When the output voltage of the main backup cell drops below a constant value, the voltage supply apparatus switches the voltage supplied to the absolute-position detection apparatus from the output voltage of the main backup cell to the output voltage of the auxiliary backup cell.

CITATION LIST

Patent Literature

Patent Literature 1: Japanese Patent Application Laid-open No. 2007-292608

SUMMARY

Technical Problem

In the conventional technology in Patent Literature 1 described above, because two backup cells are used for switching between the voltages supplied to the absolute-position detection apparatus, when the cell is switched from the main backup cell to the auxiliary backup cell that is in a state where the auxiliary backup cell cannot provide the desired output due to its failure or the like, the absolute-position detection apparatus cannot be supplied with a voltage sufficient to retain positional data. In such a case, the cell replacement grace period becomes insufficient, which is the case described above. Therefore, there is a problem in that the positional data retained in the absolute-position detection apparatus is lost.

The present invention has been achieved in view of the above and an object of the present invention is to provide a voltage supply apparatus that can prevent positional data retained in an absolute-position detection apparatus from being lost by ensuring that there is a cell replacement grace period even when only a single primary cell is used.

Solution to Problem

In order to solve the above problems and achieve the object, an aspect of the present invention is a voltage supply apparatus that supplies an auxiliary power supply voltage to an absolute-position detection apparatus that detects an absolute position of a motor, the voltage supply apparatus including: a primary cell; and a constant voltage supply unit to control an output voltage of the primary cell and supply the output voltage to the absolute-position detection apparatus. The constant voltage supply unit has a threshold set therein, the threshold being higher than a voltage level at which the absolute-position detection apparatus becomes unable to retain positional data and being lower than a steady voltage level that the constant voltage supply unit outputs when in a steady state. The constant voltage supply unit converts the output voltage of the primary cell to a voltage at the steady voltage level and supplies the voltage at the steady voltage level to the absolute-position detection apparatus until the output voltage of the primary cell falls below the threshold and, when the output voltage of the primary cell falls below the threshold, converts the output voltage of the primary cell to a voltage at a same level as the threshold and supplies the voltage to the absolute-position detection apparatus.

Advantageous Effects of Invention

According to the present invention, an effect is obtained where positional data retained in the absolute-position detection apparatus can be prevented from being lost by ensuring that there is a cell replacement grace period even when only a single primary cell is used.

DESCRIPTION OF EMBODIMENTS

Exemplary embodiments of a voltage supply apparatus according to the present invention will be explained below in detail with reference to the drawings. This invention is not limited to the embodiments.

First Embodiment

Figure 1:
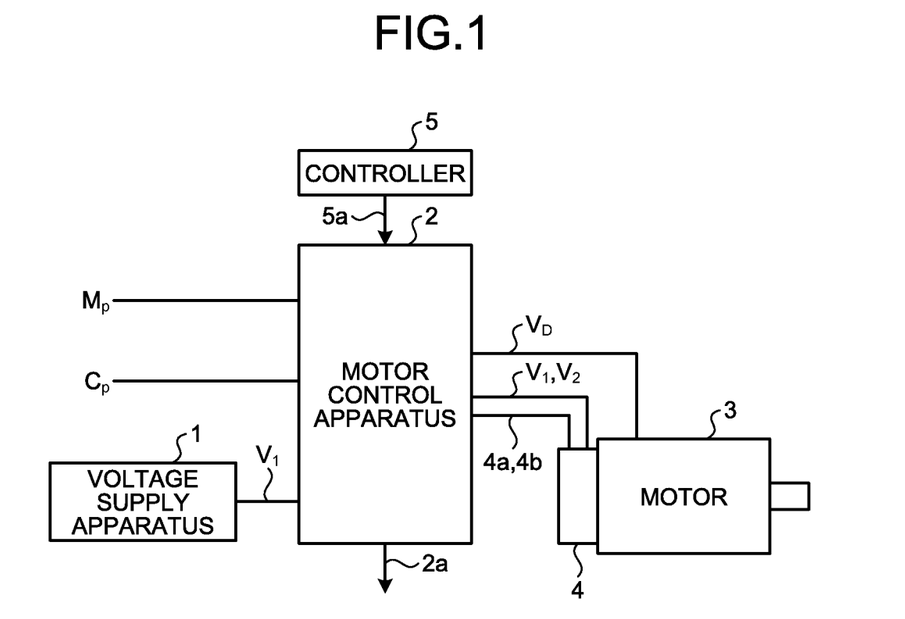
FIG. 1 is a configuration diagram of a motor control system that includes a voltage supply apparatus according to a first embodiment of the present invention.
Figure 2:
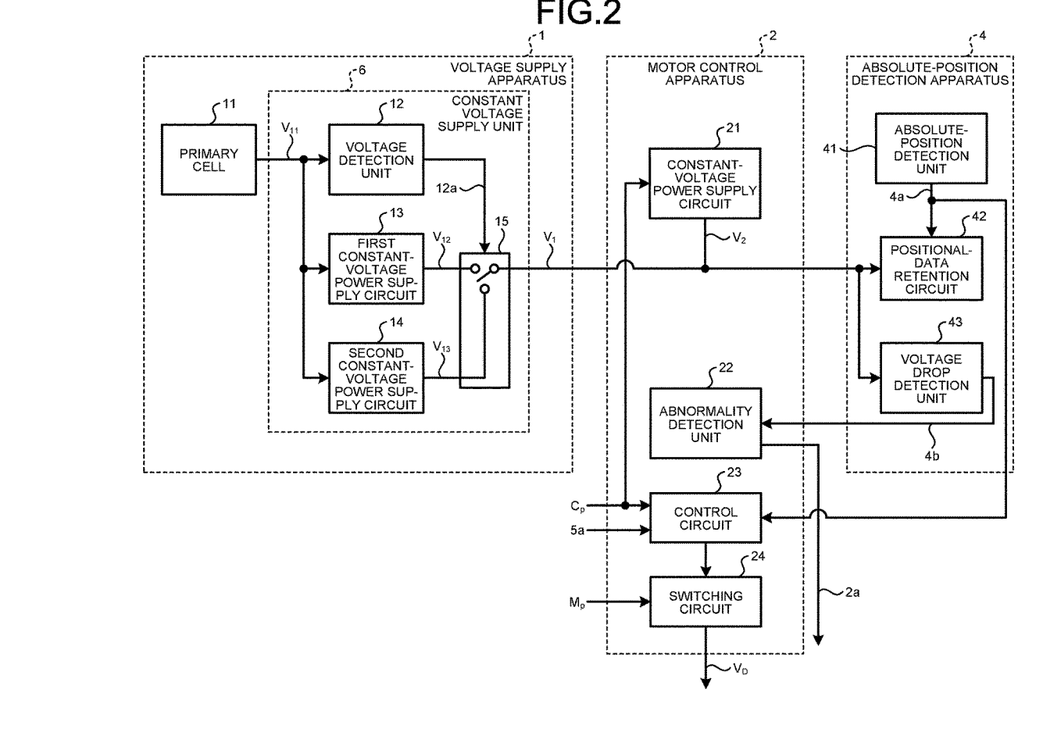
FIG. 2 is a functional block diagram of the voltage supply apparatus, a motor control apparatus, and an absolute-position detection apparatus illustrated in FIG. 1.
Figure 3:
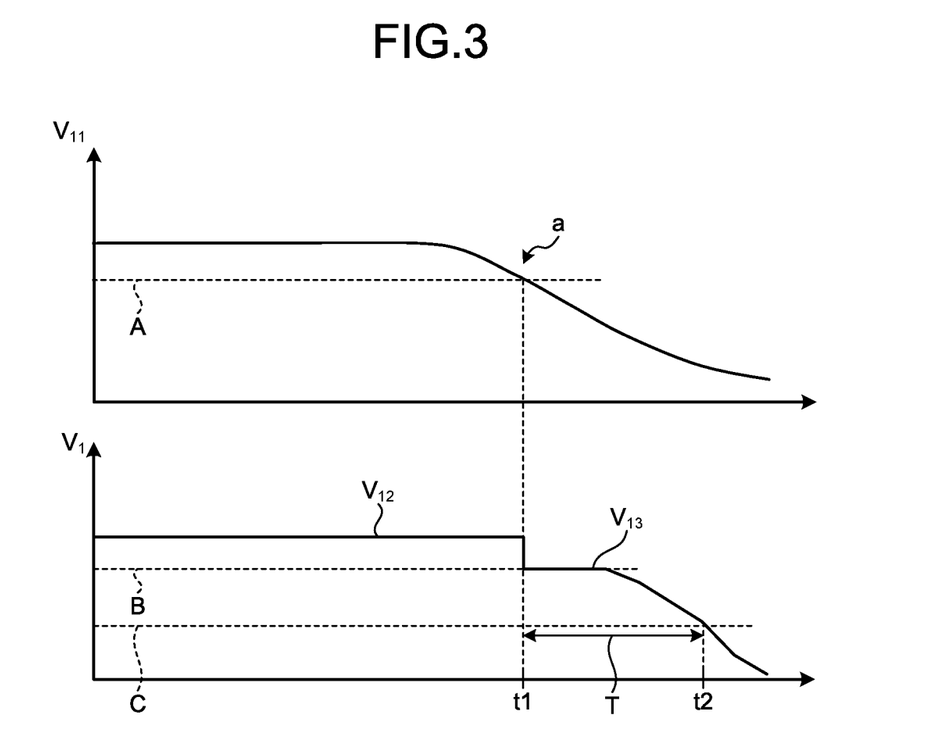
FIG. 3 is a diagram of output-voltage characteristics of the voltage supply apparatus illustrated in FIG. 1.

FIG. 1 is a configuration diagram of a motor control system that includes a voltage supply apparatus 1 according to a first embodiment of the present invention. FIG. 2 is a functional block diagram of the voltage supply apparatus 1, a motor control apparatus 2, and an absolute-position detection apparatus 4 illustrated in FIG. 1. FIG. 3 is a diagram of output-voltage characteristics of the voltage supply apparatus 1 illustrated in FIG. 1.

A motor control system illustrated in FIG. 1 includes the voltage supply apparatus 1, the motor control apparatus 2, a motor 3, the absolute-position detection apparatus 4, and a controller 5.

The voltage supply apparatus 1 supplies, to the absolute-position detection apparatus 4 via the motor control apparatus 2, an output voltage $V_1$ to prevent positional data $4a$ retained in the absolute-position detection apparatus 4 from being lost. The controller 5 generates a position command $5a$ for the motor 3 and transmits it to the motor control apparatus 2. The motor control apparatus 2 generates, on the basis of a control power supply $C_P$, an output voltage $V_2$, which is a constant voltage necessary for the absolute-position detection apparatus 4 to retain the positional data $4a$. Moreover, when the motor control apparatus 2 receives a voltage drop detection signal $4b$ from the absolute-position detection apparatus 4, the motor control apparatus 2 generates warning information $2a$. The warning information $2a$ is information that provides a warning of a drop in an output voltage $V_{11}$ of a primary cell 11 (see FIG. 2), which will be described later, and that provides a warning of a drop in the output voltage $V_2$ of a constant-voltage power supply circuit 21. Furthermore, on the basis of the control power supply $C_P$, the position command $5a$ from the controller 5, and the positional data $4a$ from the absolute-position detection apparatus 4, the motor control apparatus 2 performs frequency conversion on a main power supply $M_P$ and outputs a drive voltage $V_D$ obtained by performing the frequency conversion to the motor 3. The absolute-position detection apparatus 4 detects the absolute position of the motor 3 and transmits, to the motor control apparatus 2, the positional data $4a$, which is data on the detected absolute position. Moreover, when the value of the output voltage $V_1$ or the output voltage $V_2$ to be supplied is at a voltage drop detection level B, the absolute-position detection apparatus 4 outputs the voltage drop detection signal $4b$. The voltage drop detection level B has a value at which the absolute-position detection apparatus 4 can determine that the output voltage $V_{11}$ of the primary cell 11 has dropped. The voltage drop detection level B is lower than an output voltage $V_{12}$ of a first constant-voltage power supply circuit 13 and is higher than a positional-data loss level C. The motor 3 is driven by the drive voltage $V_D$ from the motor control apparatus 2 so as to supply power to an object to be driven (not illustrated).

The voltage supply apparatus 1 illustrated in FIG. 2 includes the primary cell 11 and a constant voltage supply unit 6. The primary cell 11 is a single auxiliary power supply for preventing the positional data $4a$ retained in the absolute-position detection apparatus 4 from being lost, and a commercially available dry cell is an example of the primary cell 11. The constant voltage supply unit 6 includes a voltage detection unit 12, the first constant-voltage power supply circuit 13, a second constant-voltage power supply circuit 14, and an output voltage selection unit 15.

The voltage detection unit 12 detects the value of the output voltage $V_{11}$ from the primary cell 11. The voltage detection unit 12 has a voltage drop determination value A set therein. When the voltage detection unit 12 detects that the output voltage $V_{11}$ falls below the voltage drop determination value A, the voltage detection unit 12 outputs an output limit signal $12a$ to the output voltage selection unit 15. The voltage drop determination value A has a value at which the absolute-position detection apparatus 4 can determine that the output voltage $V_{11}$ of the primary cell 11 has dropped due to the life or aging of the primary cell 11. Moreover, the voltage drop determination value A has a value that indicates that, after the passage of a constant period of time from when the absolute-position detection apparatus 4 determines that the output voltage $V_{11}$ of the primary cell 11 has dropped (t1 to be described later), the output voltage $V_{11}$ of the primary cell 11 will drop to the positional-data loss level C, which is a voltage level at which the absolute-position detection apparatus 4 cannot retain the positional data $4a$.

The first constant-voltage power supply circuit 13 is a regulator circuit. The first constant-voltage power supply circuit 13 converts the output voltage $V_{11}$ of the primary cell 11 to the output voltage $V_{12}$, which is a constant voltage at a steady voltage level, and outputs the output voltage $V_{12}$. The output voltage $V_{11}$ is larger than the output voltage $V_{12}$. The second constant-voltage power supply circuit 14 converts the output voltage $V_{11}$ of the primary cell 11 to an output voltage $V_{13}$, which is a constant voltage at the voltage drop detection level B, by using a regulator circuit, and outputs the output voltage $V_{13}$.

When the output voltage $V_2$ is not output from the constant-voltage power supply circuit 21 of the motor control apparatus 2 and the output limit signal $12a$ is not received from the voltage detection unit 12, the output voltage selection unit 15 selects the output voltage $V_{12}$ of the first constant-voltage power supply circuit 13. When the output limit signal $12a$ is received from the voltage detection unit 12, the output voltage selection unit 15 selects the output voltage $V_{13}$ of the second constant-voltage power supply circuit 14. The output voltage $V_1$ of the constant voltage supply unit 6 is the output voltage $V_{12}$ or the output voltage $V_{13}$ selected by the output voltage selection unit 15, and the output voltage $V_1$ is supplied to the absolute-position detection apparatus 4 via the motor control apparatus 2.

The motor control apparatus 2 includes the constant-voltage power supply circuit 21, an abnormality detection unit 22, a control circuit 23, and a switching circuit 24. The constant-voltage power supply circuit 21 generates, on the basis of the control power supply $C_P$, the output voltage $V_2$, which is a constant voltage necessary for the absolute-position detection apparatus 4 to retain the positional data 4a. When the voltage drop detection signal 4b is input from the absolute-position detection apparatus 4, the abnormality detection unit 22 generates the warning information 2a. The warning information 2a is output to the controller 5 or an external display (not illustrated). The controller 5 or the display that has received the warning information 2a audibly or visually issues a warning to the user. Consequently, it is possible to notify the user that the output voltage $V_{11}$ of the primary cell 11 has dropped. The control circuit 23 generates a control signal for controlling the switching circuit 24 on the basis of the control power supply $C_P$, the position command 5a from the controller 5, and the positional data 4a from the absolute-position detection apparatus 4. The switching circuit 24 performs frequency conversion on the main power supply $M_P$ in accordance with the control signal from the control circuit 23 and outputs the drive voltage $V_D$ obtained by performing the frequency conversion to the motor 3.

The absolute-position detection apparatus 4 includes an absolute-position detection unit 41, a positional-data retention circuit 42, and a voltage drop detection unit 43. The absolute-position detection unit 41 detects the absolute position of the motor 3 and generates the detected positional data 4a. The positional-data retention circuit 42 retains the positional data 4a by using the output voltage $V_2$ supplied from the motor control apparatus 2 or the output voltage $V_1$ supplied from the voltage supply apparatus 1. The voltage drop detection unit 43 monitors the value of the voltage supplied to the positional-data retention circuit 42. When the value of the voltage supplied to the positional-data retention circuit 42 is at the voltage drop detection level B, the voltage drop detection unit 43 outputs the voltage drop detection signal 4b.

The operation will be explained next with reference to FIG. 3. When the control power supply $C_P$ is supplied to the motor control apparatus 2, the output voltage $V_2$ necessary for retaining the positional data 4a is supplied to the absolute-position detection apparatus 4 from the constant-voltage power supply circuit 21. When the control power supply $C_P$ is not supplied to the motor control apparatus 2, the backup output voltage $V_1$, which is necessary for retaining the positional data 4a, is supplied to the absolute-position detection apparatus 4 from the constant voltage supply unit 6 of the voltage supply apparatus 1. The diagram in the upper part in FIG. 3 represents the transition of the output voltage $V_{11}$ of the primary cell 11 and the diagram in the lower part in FIG. 3 represents the transition of the output voltage $V_{12}$ and the output voltage $V_{13}$ of the voltage supply apparatus 1. Moreover, t1 represents the point in time at which the output voltage $V_{11}$ falls below the voltage drop determination value A and t2 represents the point in time at which the output voltage $V_{13}$ of the second constant-voltage power supply circuit 14 drops to the positional-data loss level C. Furthermore, a cell replacement grace period T represents the period of time from the point in time t1, at which the output voltage $V_{11}$ falls below the voltage drop determination value A, to the point in time t2, at which the output voltage $V_{13}$ of the second constant-voltage power supply circuit 14 drops to the positional-data loss level C. The voltage drop determination value A is larger than the voltage drop detection level B.

When the output voltage $V_{11}$ of the primary cell 11 is at the steady voltage level, which is higher than the voltage drop determination value A, the output voltage selection unit 15 selects the output voltage $V_{12}$ from the first constant-voltage power supply circuit 13 and supplies the selected output voltage $V_{12}$ to the absolute-position detection apparatus 4. When the output voltage $V_{11}$ of the primary cell 11 falls below the voltage drop determination value A as indicated by the symbol "a", the output voltage selection unit 15 selects the output voltage $V_{13}$ from the second constant-voltage power supply circuit 14 and supplies the selected output voltage $V_{13}$ to the absolute-position detection apparatus 4.

At this point in time, because the value of the voltage to the supplied to the absolute-position detection apparatus 4 is at the voltage drop detection level B, the voltage drop detection unit 43 outputs the voltage drop detection signal 4b and the abnormality detection unit 22 that has received the voltage drop detection signal 4b outputs the warning information 2a. Consequently, it is possible to notify the user that the output voltage $V_{11}$ of the primary cell 11 has dropped.

Moreover, as described above, the voltage drop detection level B has a value that is lower than the output voltage $V_{12}$ of the first constant-voltage power supply circuit 13 and is higher than the positional-data loss level C; therefore, it can be ensured that there is the cell replacement grace period T. In other words, it is possible to use the period of time from when the warning information 2a is generated to when the primary cell 11 becomes unusable as the cell replacement grace period T for the primary cell 11. Changing the primary cell 11 during the cell replacement grace period T can prevent the positional data 4a retained in the positional-data retention circuit 42 from being lost.

In the first embodiment, the absolute-position detection apparatus 4 includes the voltage drop detection unit 43, which outputs the voltage drop detection signal 4b to the abnormality detection unit 22 of the motor control apparatus 2. However, the configuration may be such that the motor control apparatus 2 is provided with a function the same as that of the voltage drop detection unit 43 and the motor control apparatus 2 monitors the voltage to be supplied to the positional-data retention circuit 42 and detects a voltage drop. Moreover, when the primary cell 11 is replaced, a power supply is necessary for preventing the positional data 4a retained in the positional-data retention circuit 42 from being lost during the cell replacement time that lasts from when the primary cell 11 is removed from the voltage supply apparatus 1 to when a new primary cell 11 is installed in the voltage supply apparatus 1. This power supply is, for example, met by the charge accumulated in a capacitor (not illustrated). Specifically, the capacitor has a capacity capable of allowing the data in the positional-data retention circuit 42 to be retained during the cell replacement time and the terminal voltage of the capacitor is maintained at a value that is higher than the positional-data loss level C during the cell replacement time. The cell replacement time is approximately a few seconds to a few tens of seconds if the primary cell 11 can be immediately replaced.

Second Embodiment

Figure 4:
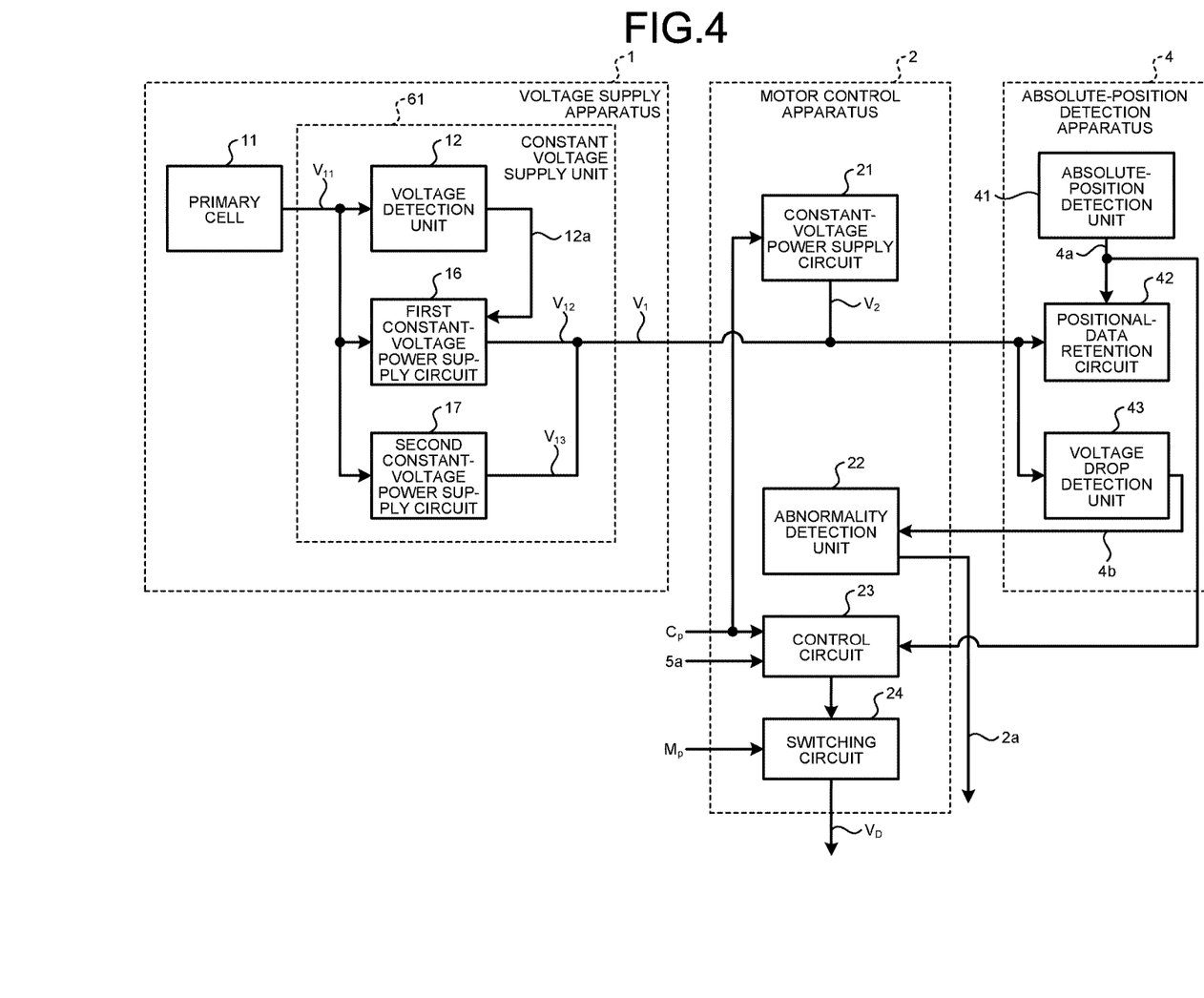
FIG. 4 is a functional block diagram of a voltage supply apparatus, a motor control apparatus, and an absolute-position detection apparatus according to a second embodiment of the present invention.

FIG. 4 is a functional block diagram of the voltage supply apparatus 1, the motor control apparatus 2, and the absolute-position detection apparatus 4 according to a second embodiment of the present invention. The difference from the first embodiment is that a constant voltage supply unit 61 is provided instead of the constant voltage supply unit 6. Hereinafter, components identical to those in the first embodiment are denoted by the same reference numerals and an explanation thereof is omitted. Only the different portions are explained here.

The constant voltage supply unit 61 includes the voltage detection unit 12, a first constant-voltage power supply circuit 16, and a second constant-voltage power supply circuit 17.

The first constant-voltage power supply circuit 16 converts the output voltage $V_{11}$ of the primary cell 11 to the output voltage $V_{12}$, which is a constant voltage at a steady voltage level, by using a regulator circuit. The first constant-voltage power supply circuit 16 then outputs the output voltage $V_{12}$ until the output voltage $V_{11}$ of the primary cell 11 falls below the voltage drop determination value A, i.e., until the output limit signal 12a is received.

The second constant-voltage power supply circuit 17 converts the output voltage $V_{11}$ of the primary cell 11 to the output voltage $V_{13}$, which is a constant voltage at the voltage drop detection level B, by using a regulator circuit, and outputs the output voltage $V_{13}$.

The output voltage $V_1$ of the constant voltage supply unit 61 is the output voltage $V_{12}$ from the first constant-voltage power supply circuit 16 or the output voltage $V_{13}$ from the second constant-voltage power supply circuit 17, and the output voltage $V_1$ is supplied to the absolute-position detection apparatus 4 via the motor control apparatus 2.

According to the second embodiment, the output voltage selection unit 15 is not necessary and thus, with a simple configuration, a backup power supply voltage can be supplied to the absolute-position detection apparatus 4. Therefore, the reliability can improve and the cost can be reduced.

As described above, the voltage supply apparatus 1 according to the first and second embodiments includes: the primary cell 11; and the constant voltage supply unit 6 or 61, which controls the output voltage $V_{11}$ of the primary cell 11 and supplies the output voltage $V_{11}$ to the absolute-position detection apparatus 4. The constant voltage supply unit 6 or 61 has the voltage drop determination value A set therein, where the voltage drop determination value A is a threshold that is higher than the positional-data loss level C, which is a voltage level at which the absolute-position detection apparatus 4 cannot retain the positional data 4a, and is lower than the output voltage $V_{12}$, which is a constant voltage at a steady voltage level that the constant voltage supply unit 6 or 61 outputs when in a steady state. The constant voltage supply unit 6 or 61 converts the output voltage $V_{11}$ of the primary cell 11 to the output voltage $V_{12}$, which is a voltage at a steady voltage level, and supplies the output voltage $V_{12}$ to the absolute-position detection apparatus 4 until the output voltage $V_{11}$ of the primary cell 11 falls below the threshold. When the output voltage $V_{11}$ of the primary cell 11 falls below the threshold, the constant voltage supply unit 6 or 61 converts the output voltage $V_{11}$ of the primary cell 11 to the output voltage $V_{13}$, which is a voltage at the same level as the threshold, and supplies the output voltage $V_{13}$ to the absolute-position detection apparatus 4. With this configuration, it is possible to ensure that there is the cell replacement grace period T, which is the period of time until the output voltage $V_{11}$ of the primary cell 11 drops to the positional-data loss level C; therefore, even when a single primary cell 11 is used, the positional data 4a retained in the absolute-position detection apparatus 4 can be prevented from being lost.

Moreover, in the voltage supply apparatus 1 according to the present invention, because the output voltage drop of the primary cell 11 can be detected on the voltage supply apparatus 1 side, even when, for example, the primary cell 11 used has a different power supply capacity, this can be accommodated simply by changing the settings of the voltage detection unit 12 in the voltage supply apparatus 1 and without changing the settings of the motor control apparatus 2 and the absolute-position detector (not illustrated). Therefore, even when the type of the primary cell 11 is changed, the motor control system can inexpensively cope with this.

INDUSTRIAL APPLICABILITY

As described above, the present invention is useful for a voltage supply apparatus that supplies a backup power supply voltage to an absolute-position detection apparatus.

REFERENCE SIGNS LIST

1 voltage supply apparatus, 2 motor control apparatus, 3 motor, 4 absolute-position detection apparatus, 5 controller, 6 constant voltage supply unit, 11 primary cell, 12 voltage detection unit, 13 first constant-voltage power supply circuit, 14 second constant-voltage power supply circuit, 15 output voltage selection unit, 16 first constant-voltage power supply circuit, 17 second constant-voltage power supply circuit, 21 constant-voltage power supply circuit, 22 abnormality detection unit, 23 control circuit, 24 switching circuit, 41 absolute-position detection unit, 42 positional-data retention circuit, 43 voltage drop detection unit, 61 constant voltage supply unit.

The invention claimed is:

1. A voltage supply apparatus that supplies an auxiliary power supply voltage to an absolute-position detection apparatus that detects an absolute position of a motor, the voltage supply apparatus comprising:

a primary cell; and a constant voltage supply unit to control an output voltage of the primary cell and supply the output voltage to the absolute-position detection apparatus, wherein the constant voltage supply unit has a determination value set therein, the determination value being used for determining that the output voltage of the primary cell drops, the constant voltage supply unit converts the output voltage of the primary cell to a voltage at a steady voltage level that the constant voltage supply unit outputs when in a steady state and supplies the voltage at the steady voltage level to the absolute-position detection apparatus until the output voltage of the primary cell falls below the determination value and, when the output voltage of the primary cell falls below the determination value, converts the output voltage of the primary cell to a voltage that is higher than a voltage level at which the absolute-position detection apparatus becomes unable to retain positional data and is lower than the steady voltage level and supplies the voltage to the absolute-position detection apparatus, the voltage has a value that is at a same level as the determination value and at which the absolute-position detection apparatus is able to determine that the output voltage of the primary cell drops, and the constant voltage supply unit includes a first constant-voltage power supply circuit to convert the output voltage of the primary cell to the voltage at the steady voltage level and supply the voltage at the steady voltage level to the absolute-position detection apparatus until the output voltage of the primary cell falls below the determination value, and a second constant-voltage power supply circuit to, when the output voltage of the primary cell falls below the determination value, convert the output voltage of the primary cell to the voltage that is higher than a voltage level at which the absolute-position detection apparatus becomes unable to retain positional data and is lower than the steady voltage level and supply the voltage to the absolute-position detection apparatus.

2. A voltage supply apparatus that supplies an auxiliary power supply voltage to an absolute-position detection apparatus that detects an absolute position of a motor, the voltage supply apparatus comprising:

a primary cell; and a constant voltage supply unit to control an output voltage of the primary cell and supply the output voltage to the absolute-position detection apparatus, wherein the constant voltage supply unit has a determination value set therein, the determination value being used for determining that the output voltage of the primary cell drops, the constant voltage supply unit converts the output voltage of the primary cell to a voltage at a steady voltage level that the constant voltage supply unit outputs when in a steady state and supplies the voltage at the steady voltage level to the absolute-position detection apparatus until the output voltage of the primary cell falls below the determination value and, when the output voltage of the primary cell falls below the determination value, converts the output voltage of the primary cell to a voltage that is higher than a voltage level at which the absolute-position detection apparatus becomes unable to retain positional data and is lower than the steady voltage level and supplies the voltage to the absolute-position detection apparatus, the voltage has a value that is at a same level as the determination value and at which the absolute-position detection apparatus is able to determine that the output voltage of the primary cell drops, and the determination value is a value that indicates that the output voltage of the primary cell drops to a voltage level at which the absolute-position detection apparatus becomes unable to retain positional data after a passage of a constant period of time from when the absolute-position detection apparatus determines that the output voltage of the primary cell drops.

\* \* \* \* \*